United States Patent [19]

Tomczak et al.

[11] Patent Number: 5,580,028
[45] Date of Patent: Dec. 3, 1996

[54] JOUNCE PLATE FASTENER RETENTION SYSTEM

[75] Inventors: Dara M. Tomczak; Michelle L. O'Connor, both of Royal Oak; Mark F. Jacoby, West Bloomfield, all of Mich.

[73] Assignee: Chrysler Corporation, Auburn Hills, Mich.

[21] Appl. No.: 550,131

[22] Filed: Oct. 30, 1995

[51] Int. Cl.⁶ ............................................. F16M 13/00
[52] U.S. Cl. ..................... 248/634; 248/635; 248/632; 267/293; 267/153
[58] Field of Search .................................... 248/634, 635, 248/606, 613, 632; 267/293, 153, 141

[56] References Cited

U.S. PATENT DOCUMENTS

| | | | |
|---|---|---|---|
| 3,731,896 | 5/1973 | Fehlberg | 248/9 |
| 4,056,249 | 11/1977 | Hashimoto | 248/9 |
| 4,067,524 | 1/1978 | Brinkmann | 248/9 |
| 4,183,496 | 1/1980 | Brock et al. | 248/638 |
| 4,262,889 | 4/1981 | Moore | 267/140.5 |
| 4,300,649 | 11/1981 | Sakata | 180/55 |
| 4,634,081 | 1/1987 | Chee | 244/54 |
| 4,725,046 | 2/1988 | Sugino | 267/140.1 |
| 4,783,039 | 11/1988 | Peterson et al. | 248/635 |
| 4,921,203 | 5/1990 | Peterson et al. | 248/635 |
| 5,174,541 | 12/1992 | Hutter et al. | 248/636 |
| 5,273,131 | 12/1993 | Uchiyama et al. | 180/293 |

*Primary Examiner*—Leslie A. Braun
*Assistant Examiner*—Willie Berry, Jr.
*Attorney, Agent, or Firm*—G. Andrew Barger

[57] ABSTRACT

The present invention provides a jounce plate fastener retention system and method of installation. A bushing is disposed within a cradle isolator of the fastener retention system. A plurality of radially spaced legs are formed from the bushing and extend outward therefrom. A fastener extends through a rigid fastener surround and a fastener retainer washer. Moreover, a jounce plate that is vertically spaced from the cradle isolator is also provided. The bore of the jounce plate is of a diameter that is less than the diameter of the fastener so that an interference fit is created between the jounce plate and the fastener when the fastener is inserted through the bore of the jounce plate.

6 Claims, 3 Drawing Sheets

JOUNCE PLATE FASTENER RETENTION SYSTEM

BACKGROUND OF THE INVENTION

1. Field of the Invention

The present invention generally relates to the art of bushings. In particular, the present invention relates to a jounce plate fastener retention system for a vehicle employing an oversized bushing that is used to create an interference fit with a fastener, thereby holding the fastener in place until the fastener and associated parts can be affixed to the vehicle or a mating vehicle part.

2. Description of the Related Art

Modular vehicle manufacturing has been used throughout the automotive industry over the past several years. This type of manufacturing strives to reduce the number and associated complexity of parts used in vehicles. A reduction in the number of parts in a vehicle is very valuable since it decreases costs and increases productivity. One area of vehicle design that has been particularly troublesome to modularize is the suspension system. Vehicle suspension systems are relatively complex in design and affect the overall ride and handling of the vehicle. Therefore, a reduction in suspension parts could have a decided impact on how the vehicle "feels" to a driver.

Jounce plates are commonly used in suspension systems and are disposed between a vehicle cross member and the suspension system to reduce jounce effects on the vehicle when a wheel is bounced up in the vertical direction. Jounce plates also help to reduce noise, vibration, and harshness that may be caused by the suspension. In an attempt to modularize the undercarriage of the vehicle, manufacturers have attached the engine cradle and suspension prior to installation on a cross member of the vehicle. This is accomplished by inserting a fastener through retention bores in the cradle isolator, suspension, and jounce plate.

In the past, up to four snap rings have been used to hold the fastener, cradle isolator, suspension, and jounce plate in place for shipping and subsequent attachment to the vehicle cross member on an assembly line. Unfortunately, the snap rings could cross thread with the fastener upon torquing as a result of the snap ring coming in contact with the threads of the fastener.

A method for mounting an engine is claimed in U.S. Pat. No. 3,694,895 (the '895 patent) to Werner. The engine mount shown in the '895 patent has a rubber bushing that overflows into a bolt retention cavity so that it comes in contact with a corresponding annular groove that is disposed on a bolt to hold the bolt within the cradle isolator. This is a limiting arrangement in that the use of special bolts that have annular grooves is required. This limits the length and the diameter of the bolt or fastener that can be used. Moreover, by allowing the oversized rubber bushing in the cradle isolator to "overflow" to come into contact with the bolt, tilting of the bolt from its axial center is prohibited so that it cannot extend through retention bores in the cross member, suspension, or jounce plate that may be slightly off centered due to body build variances. This greatly impedes installation time on the assembly line. A further limitation with the '895 patent is that torquing of the bolt would cause the rubber of the bushing to be pulled in to the bolt retention cavity thereby making torquing more difficult and weakening performance of the bushing. Thus, the nut must be torqued while the bolt remains stationary. This option is not available for retention systems that employ the use of a cage-nut assembly which wholly encases the nut upon installation.

It is therefore desirable in the art to have a fastener retention system employing the use of an oversized jounce plate that will retain the fastener, cradle isolator, jounce plate, and any associated washers in place without the need for a snap ring thereby eliminating cross-threading during decking on an assembly line. It is also desirable to have a cradle isolator that allows for slight tilting of the fastener thereby providing play for body build variations. It would also be advantageous to have an oversized jounce plate that can retain fasteners of various lengths and diameters.

SUMMARY OF THE INVENTION

The present invention provides a jounce plate fastener retention system and method of installation that has a cradle isolator with a bore extending therethrough. A bushing is disposed within the cradle isolator and defines the bore. A plurality of radially spaced legs are formed from the bushing and extend outward therefrom. The plurality of radially spaced legs abut a fastener retainer washer. A rigid fastener surround is also provided and is in contact with the bushing of the cradle isolator. A fastener extends through the rigid fastener surround and the fastener retainer washer. The fastener has a cap end and a threaded end disposed opposite the cap end. Moreover, a jounce plate that is vertically spaced from the cradle isolator is also provided. The jounce plate has a bore that extends therethrough and a bushing that defines the bore. A rigid facing is attached to the bushing of the jounce plate. The bore of the jounce plate is of a diameter that is less than the diameter of the fastener so that an interference fit is created between the jounce plate and the fastener when the fastener is inserted through the bore of the jounce plate.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
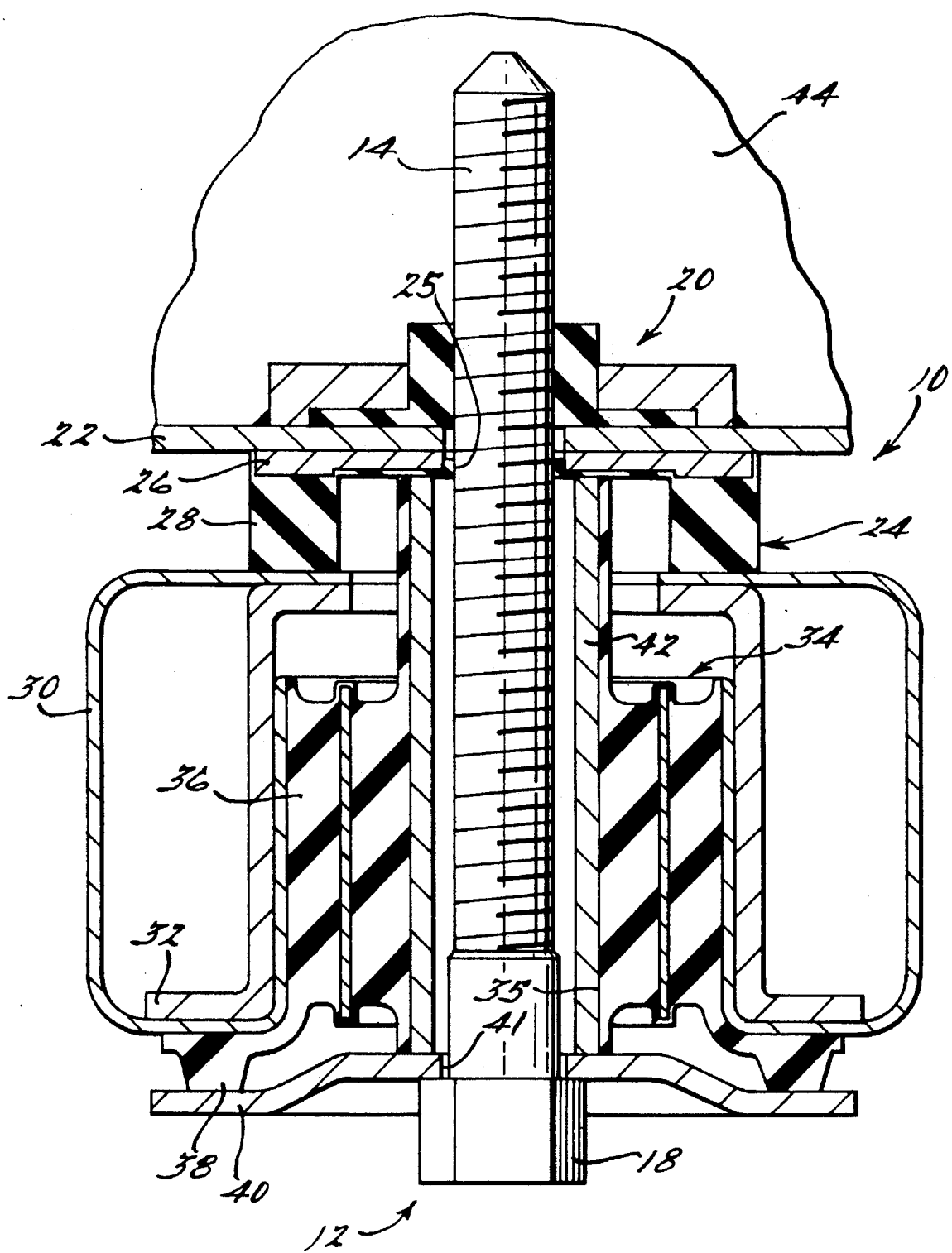
FIG. 1 is a cross sectional view of a cradle isolator retention system of the present invention.
Figure 2:
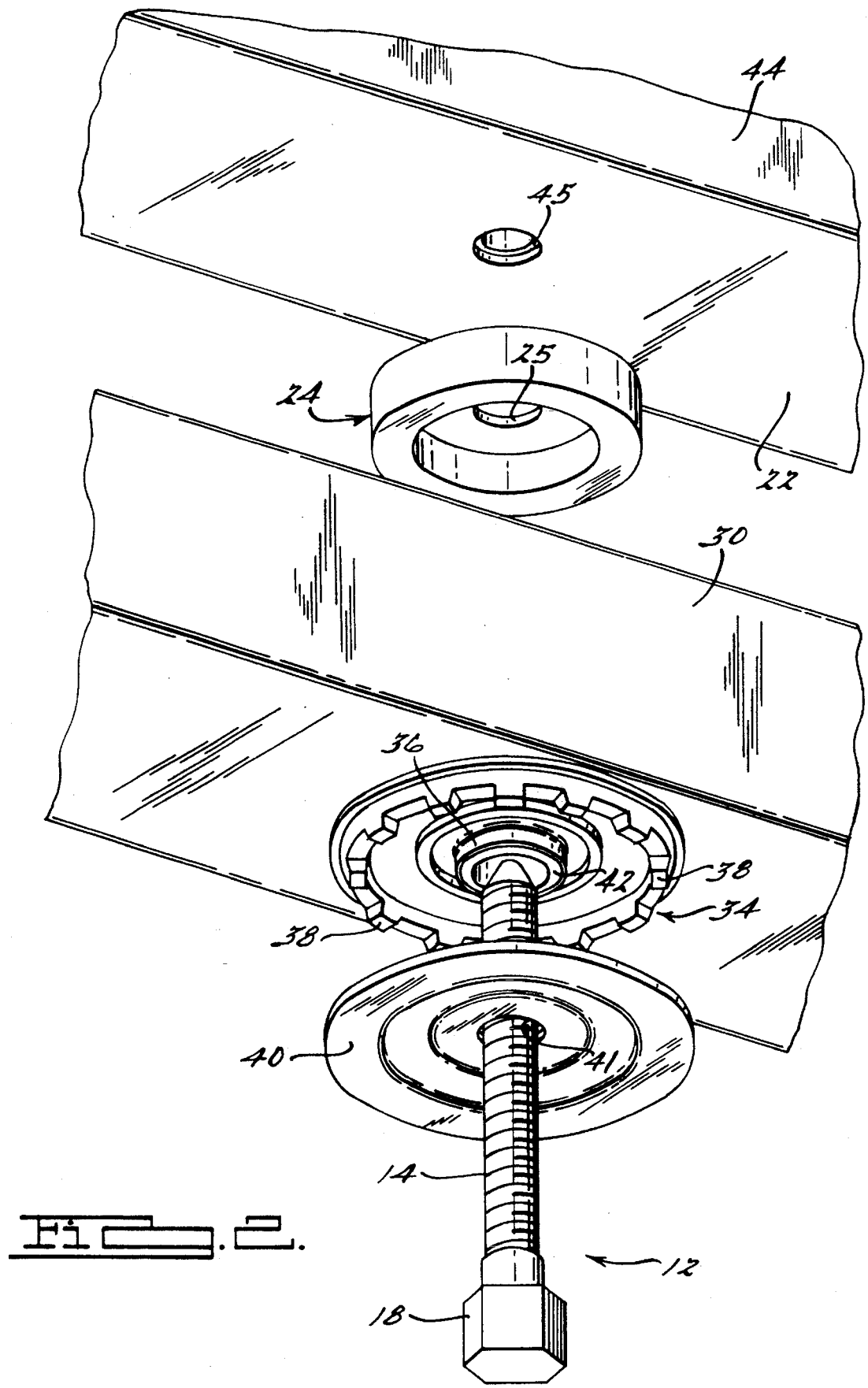
FIG. 2 is an exploded view of the cradle isolator retention system of the present invention.

Commencing with FIG. 1, a jounce plate fastener retention system 10 is shown. The jounce plate fastener retention system 10 has a fastener 12 with a cap end 18 and a threaded end 14 disposed opposite the cap end 18. In the preferred embodiment the fastener 12 is a bolt. It is understood, however, by those skilled in the art that the fastener 12 could also be a press fit nail or screw. A fastener retainer washer 40 is provided that abuts against the cap end 18 of the fastener 12. As is best seen in FIG. 2, the fastener retainer washer 40 has a bore 41 that extends therethrough.

The jounce plate fastener retention system 10 further has a cradle isolator 34 with a bore 35 that extends therethrough. The cradle isolator 34 is in communication with the fastener retainer washer 40. A bushing 36 is disposed within the cradle isolator 34 and defines the bore 35. In the preferred embodiment a plurality of radially spaced legs 38 are formed from the bushing 36 and extend outward therefrom The plurality of radially spaced legs 38 abut the fastener retainer washer 40. A rigid fastener surround 42 is in contact with the bushing 36 of the cradle isolator 34. The fastener 12 extends through the rigid fastener surround 42 and the bore 41 of the fastener retainer washer 40.

A jounce plate 24 is provided that is vertically spaced from the cradle isolator 34. The jounce plate 24 has a bore 25 that extends therethrough. A bushing 28 defines the bore 25. While a rigid facing 26 is attached to the bushing 28 of the jounce plate 24. The bore 25 of the jounce plate 24 is of a diameter that is less than the diameter of the fastener 12 that is inserted therethrough. Thus, fundamental to the invention at hand, an interference fit is created between the jounce plate 24 and the fastener 12 when the fastener 12 is inserted through the bore 25 of the jounce plate 24. The fastener 12 is also inserted through a cage-nut assembly 20 that is typically welded into the body rail 44. At its lower end the cage-nut assembly abuts against a lower surface 22 of the body rail 44. The lower surface 22 also abuts the rigid facing 26 of the jounce plate 24.

Figure 3:
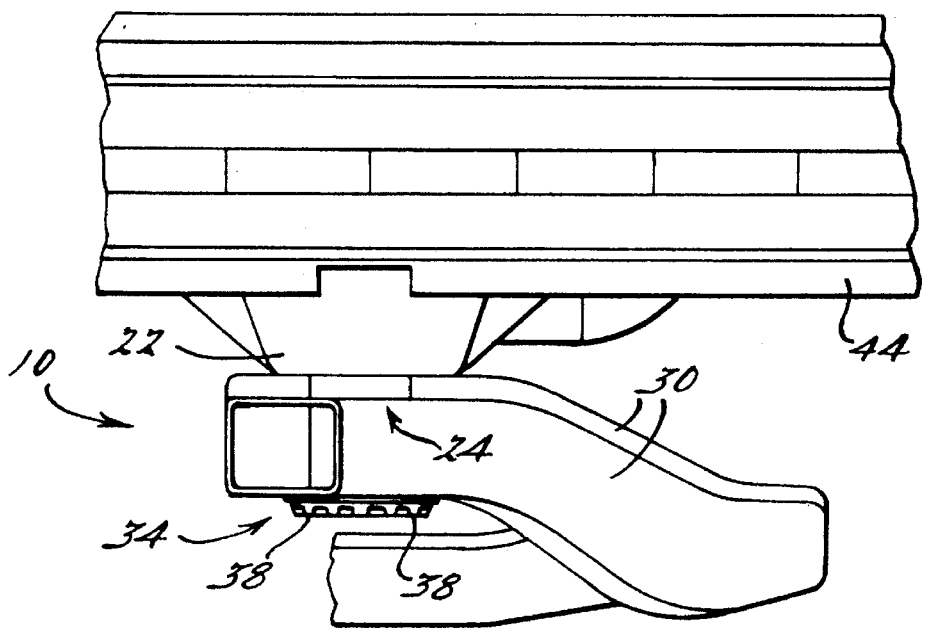
FIG. 3 is a side elevational view of the cradle isolator retention system of the present invention when installed on a vehicle.
Figure 4:
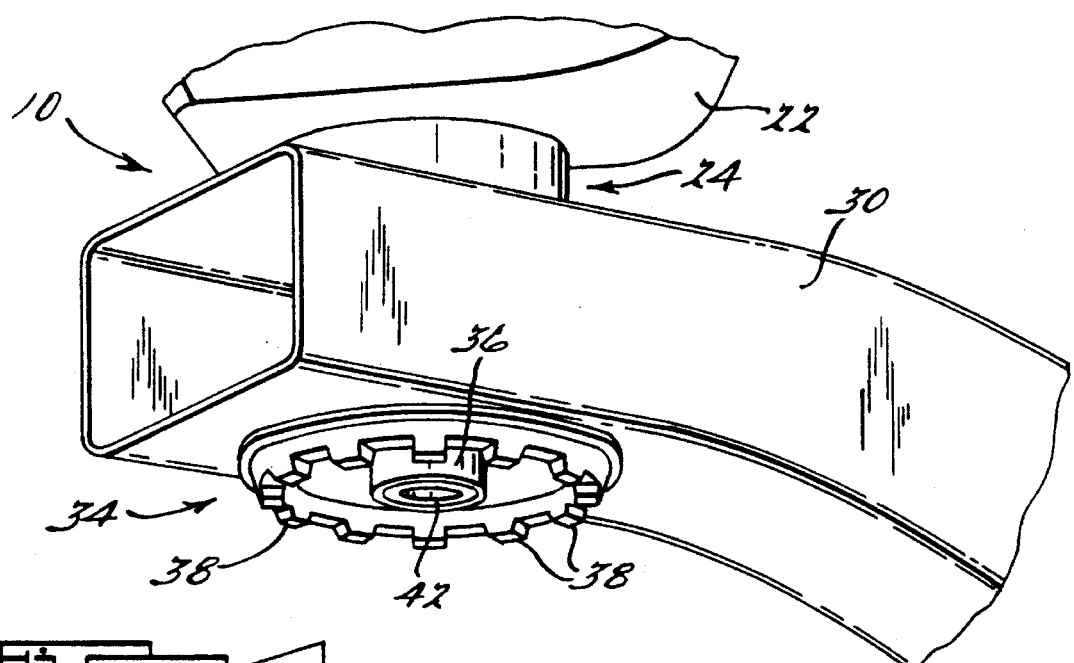
FIG. 4 is a perspective view of a cradle isolator when installed in an engine cradle of the present invention.

Referring now to FIGS. 3 and 4, the jounce plate fastener retention system 10 is shown installed in a body rail 44 of a vehicle (not shown). The jounce plate 24 is disposed between the lower surface 22 of the body rail 44 and an engine cradle 30 to lessen the effects of jounce from the suspension (not shown) of the vehicle. As best seen in FIG. 1, the engine cradle 30 has a body mount cup 32 that is welded inside its frame. Referring to FIG. 4, the jounce plate fastener retention system 10 is shown perspectively with the cradle isolator 34 disposed partially within the engine cradle 30.

A method for installing the jounce plate fastener retention system 10 in a vehicle is also provided. As best seen in the exploded view of FIG. 2 the method of installation includes the step of inserting the fastener 12 through the bore 41 of the washer 40, the cradle isolator 34, the engine cradle 30, the jounce plate 24 that has a bore 25 that is of a diameter less than the diameter of the fastener 12 so that an interference fit is created between the jounce plate 24 and the fastener 12 when the fastener 12 is inserted through the bore 25 of the jounce plate 24, and the body rail 44 of the vehicle. The method further includes the step of inserting the fastener 12 through the cage-nut assembly 20. In addition, although the fastener 12 is held in place by the jounce plate 24, the method also includes the step of torquing the fastener 12 so that it engages the body rail 44 of the vehicle once installed.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A jounce plate fastener retention system comprising:

a fastener retainer washer;

a cradle isolator in communication with the fastener retainer washer, the cradle isolator having a bore extending therethrough, and a bushing disposed within the cradle isolator defining the bore;

a rigid fastener surround in contact with the bushing of the cradle isolator;

a fastener extending through the rigid fastener surround and the fastener retainer washer, the fastener having a cap end and a threaded end disposed opposite the cap end; and a jounce plate vertically spaced from the cradle isolator, the jounce plate having a bore extending therethrough, a bushing defining the bore, and a rigid facing attached to the bushing of the jounce plate, the bore of the jounce plate being of a diameter less than the diameter of the fastener so that an interference fit is created between the jounce plate and the fastener when the fastener is inserted through the bore of the jounce plate.

2. The jounce plate fastener retention system of claim 1 wherein the fastener is a bolt.

3. A jounce plate fastener retention system comprising:

a fastener retainer washer;

a cradle isolator in communication with the fastener retainer washer, the cradle isolator having a bore extending therethrough, a bushing disposed within the cradle isolator defining the bore, and a plurality of radially spaced legs formed from the bushing and extending outward therefrom, the plurality of radially spaced legs abutting the fastener retainer washer;

a rigid fastener surround in contact with the bushing of the cradle isolator;

a fastener extending through the rigid fastener surround and the fastener retainer washer, the fastener having a cap end and a threaded end disposed opposite the cap end; and a jounce plate vertically spaced from the cradle isolator, the jounce plate having a bore extending therethrough, a bushing defining the bore, and a rigid facing attached to the bushing of the jounce plate, the bore of the jounce plate being of a diameter less than the diameter of the fastener so that an interference fit is created between the jounce plate and the fastener when the fastener is inserted through the bore of the jounce plate.

4. A method for installing a jounce plate fastener retention system in a vehicle comprising the step of inserting a fastener through a bore of a washer, a cradle isolator, an engine cradle, a jounce plate having a bore that is of a diameter less than the diameter of the fastener so that an interference fit is created between the jounce plate and the fastener when the fastener is inserted through the bore of the jounce plate, and a body rail of the vehicle.

5. The method of installing a jounce plate fastener retention system of claim 4 further comprising the step of inserting the fastener through a cage-nut assembly.

6. The method of installing a jounce plate fastener retention system of claim 5 further comprising the step of torquing the fastener so that it engages the body rail of the vehicle.

* * * * *